US008641271B2

(12) United States Patent
Wang et al.

(10) Patent No.: US 8,641,271 B2
(45) Date of Patent: Feb. 4, 2014

(54) METHOD FOR TESTING HEAT PIPES

(75) Inventors: Feng-Ku Wang, Taipei (TW); Yi-Lun Cheng, Taipei (TW); Chih-Kai Yang, Taipei (TW)

(73) Assignee: Inventec Corporation, Taipei (TW)

( * ) Notice: Subject to any disclaimer, the term of this patent is extended or adjusted under 35 U.S.C. 154(b) by 947 days.

(21) Appl. No.: 12/772,540

(22) Filed: May 3, 2010

(65) Prior Publication Data

US 2011/0122915 A1 May 26, 2011

(30) Foreign Application Priority Data

Nov. 25, 2009 (TW) ................................ 98140226 A

(51) Int. Cl.
*G01K 1/16* (2006.01)
(52) U.S. Cl.
USPC .............................................. 374/44; 374/43
(58) Field of Classification Search
USPC ............... 374/1, 43, 44, 10–11, 29, 134–135, 374/179, 208, 4–5, 45, 57, 110–112, 115, 374/137, 141
See application file for complete search history.

(56) References Cited

U.S. PATENT DOCUMENTS

| 3,453,865 | A  | * | 7/1969  | Reiter et al. ..................... 374/33 |
| 4,008,615 | A  | * | 2/1977  | MacMaster ..................... 374/116 |
| 4,336,708 | A  | * | 6/1982  | Hobgood et al. .................. 374/5 |
| 5,112,136 | A  | * | 5/1992  | Sakuma et al. .................. 374/44 |
| 6,065,664 | A  | * | 5/2000  | Garner et al. .................. 228/126 |
| 6,862,941 | B2 | * | 3/2005  | Alpert et al. .................... 73/861 |
| 7,147,368 | B2 | * | 12/2006 | Chien .......................... 374/147 |
| 7,168,851 | B2 | * | 1/2007  | Kim et al. ....................... 374/44 |
| 7,374,334 | B2 | * | 5/2008  | Liu et al. ........................ 374/44 |
| 7,547,138 | B2 | * | 6/2009  | Liu et al. ........................ 374/44 |
| 8,322,917 | B2 | * | 12/2012 | Gatti et al. ...................... 374/44 |
| 2003/0072349 | A1 | * | 4/2003 | Osone et al. ..................... 374/43 |
| 2006/0256834 | A1 | * | 11/2006 | Chang et al. ...................... 374/5 |
| 2007/0047614 | A1 | * | 3/2007 | Lee et al. ........................ 374/44 |
| 2012/0269227 | A1 | * | 10/2012 | Stothers ............................ 374/3 |

* cited by examiner

*Primary Examiner* — Peter Macchiarolo
*Assistant Examiner* — Tania Courson
(74) *Attorney, Agent, or Firm* — Morris, Manning & Martin, LLP; Tim Tingkang Xia, Esq.

(57) ABSTRACT

A method for testing heat pipes includes the following steps. A plurality of bar-shaped heat pipes having the same size is provided, and the heat pipes are deformed. The deformed heat pipes are placed in a temperature regulator, such that a temperature of the heat pipes is periodically changed between a first temperature and a second temperature. The heat pipes are then taken out of the temperature regulator. One end of each heat pipe is maintained at a third temperature by a thermostatic device, and a heat pipe temperature difference of two opposite ends of the heat pipe is measured. The heat pipes having the heat pipe temperature difference greater than a standard temperature difference in the heat pipes are marked.

6 Claims, 5 Drawing Sheets

METHOD FOR TESTING HEAT PIPES

CROSS-REFERENCE TO RELATED APPLICATIONS

This non-provisional application claims priority under 35 U.S.C. §119(a) on Patent Application No(s). 098140226 filed in Taiwan, R.O.C. on Nov. 25, 2009, the entire contents of which are hereby incorporated by reference.

BACKGROUND OF THE INVENTION

1. Field of the Invention

The present invention relates to a method for testing heat dissipation elements, and more particularly to a method for testing heat pipes.

2. Related Art

In recent years, with the rapid progress of computer technology, the operating speed of the computer is continuously increased, and the heat generation rate of electronic elements in the computer also rises accordingly. In order to prevent the electronic elements in the computer from getting overheated to cause a temporary or permanent failure to the electronic elements, a heat dissipation module is placed in the computer in the prior art, so as to dissipate the heat generated by the electronic elements out of the computer.

In the electronic elements, a central processing unit (CPU) is a main heat generation source among the electronic elements of the computer. When the CPU is operating at a high speed, if the temperature of the CPU exceeds a normal working temperature range, a computing error may easily occur to the CPU, or the CPU is temporarily failed, resulting in a breakdown of the computer. In addition, when the temperature of the CPU far exceeds the normal working temperature range, transistors in the CPU may be easily damaged and cause permanent failure to the CPU.

Therefore, when the computers are manufactured, in order to ensure a normal operation of the heat dissipation module assembled in the computer within a warranty period, manufacturers of the computers need to accurately master the quality of each element in the heat dissipation module. In the heat dissipation module of the computer, a heat pipe is a heat transfer medium for transferring heat from a heat source to heat sink fins. Therefore, it is in need of urgent solutions in the industry on how to test a batch of sampled heat pipes so as to predict actual performances of the heat pipes when assembled in the heat dissipation modules.

SUMMARY OF THE INVENTION

Accordingly, the present invention is a method for testing heat pipes, so as to test a batch of sampled heat pipes, thereby accurately predicting actual performances of the heat pipes when assembled in heat dissipation modules.

The method for testing heat pipes comprises the following steps. A plurality of bar-shaped heat pipes having the same size is provided, and the heat pipes are deformed. The deformed heat pipes are placed in a temperature regulator, such that a temperature of the heat pipes is periodically changed between a first temperature and a second temperature. The heat pipes are then taken out of the temperature regulator. One end of each heat pipe is maintained at a third temperature by a thermostatic device, and a heat pipe temperature difference of two opposite ends of the heat pipe is measured. The heat pipes having the heat pipe temperature difference smaller than a standard temperature difference in the heat pipes are marked.

In other embodiments of the present invention, the method for testing the heat pipes further comprises the following steps. One end of each heat pipe is immersed in a thermostatic water tank, and water in the thermostatic water tank is maintained at a thermostatic state. The heat pipe temperature difference of the two opposite ends of each heat pipe is measured after a measuring time.

In other embodiments of the present invention, after the step of measuring the heat pipe temperature difference of the two opposite ends of each heat pipe, the method for testing the heat pipes further comprises the following steps. A temperature measuring position is selected between the two ends of the heat pipe. One end of the heat pipe is heated, and the other end of the heat pipe is cooled by a cooling device, so as to maintain a temperature of the temperature measuring position of the heat pipe at a fourth temperature, thereby acquiring a maximum heat transfer rate of each heat pipe. The heat pipes having the maximum heat transfer rate lower than a standard rate in the heat pipes are marked. Preferably, the step of maintaining the temperature of the temperature measuring position of the heat pipe at the fourth temperature further comprises the following sub-steps. A plane is formed on the other end of the heat pipe. The plane is pressed on a bearing plane of a heater. The heat pipe is heated by the heater.

In other embodiments of the present invention, after the step of acquiring the maximum heat transfer rate of each heat pipe, the method for testing the heat pipes further comprises the following steps. One end of each heat pipe is heated by a heating block until the heat pipe breaks or leaks, and a damage temperature when each heat pipe breaks or leaks is recorded. The heat pipes having the damage temperature lower than a second standard temperature in the heat pipes are marked.

Generally, the heat pipes of the heat dissipation modules installed in a notebook computer are deformed to have a bent appearance. In the above embodiments, the bar-shaped heat pipes are firstly bent and then tested, so that the testing method simulates the state that the heat pipes are installed in a notebook computer. Therefore, actual performances of the heat pipes when assembled in the heat dissipation modules can be accurately predicted through a test result acquired in the testing method.

Moreover, in addition to being bent, the heat pipe of the heat dissipation module installed in the notebook computer is pressed on a chip by a heat conducting block, and a plane on a surface of the heat pipe is adhered to a bearing surface of the heat conducting block. In the above embodiments, a plane is formed on the other end of each heat pipe, and then pressed on a bearing plane of a heater, so that the testing method simulates the state that the heat pipes are installed in a notebook computer. Therefore, actual performances of the heat pipes when assembled in the heat dissipation modules can be accurately predicted through a test result acquired in the testing method.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

Figure 1:
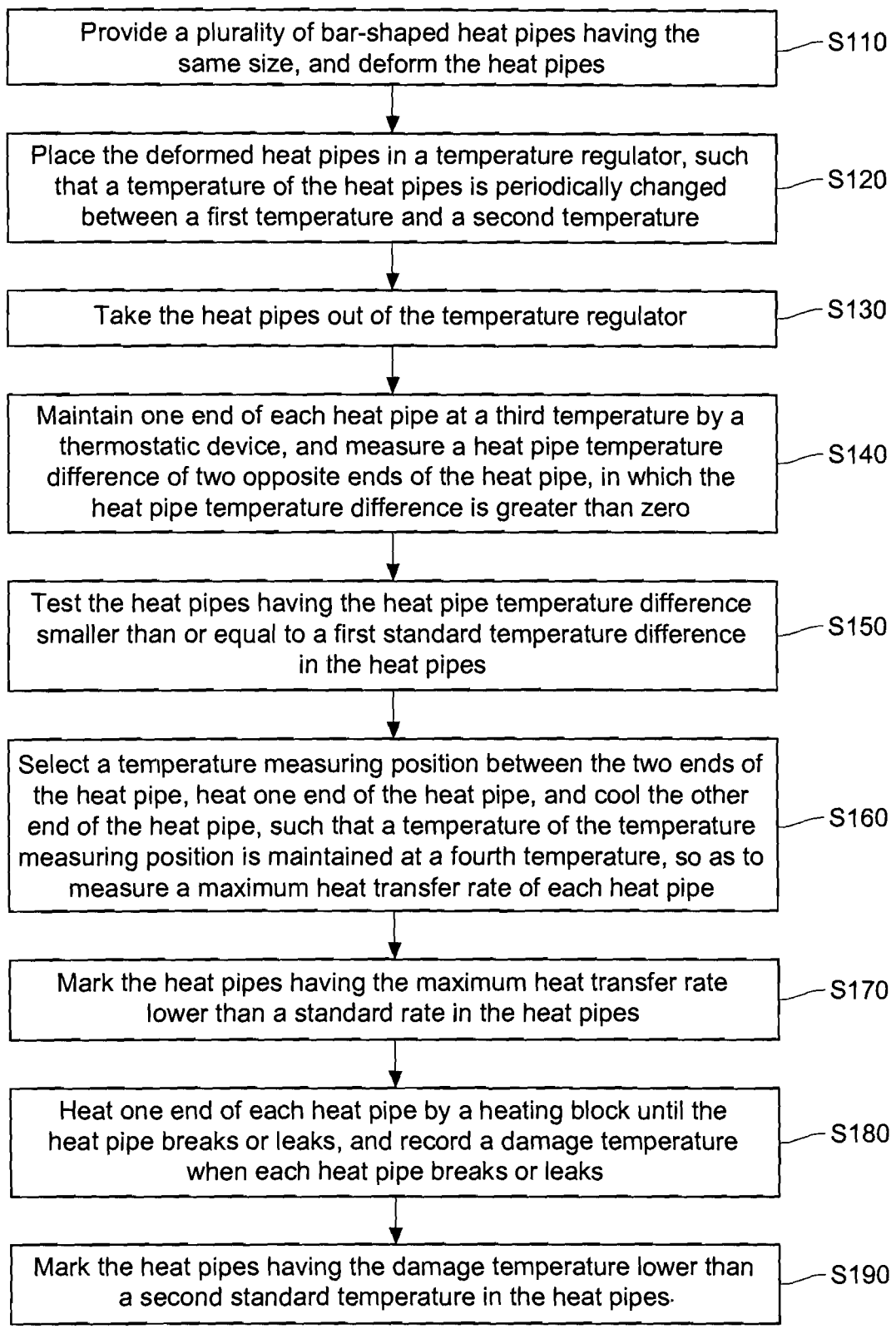
FIG. 1 is a schematic view of a method for testing heat pipes according to an embodiment of the present invention.

FIG. 1 is a schematic view of a method for testing heat pipes according to an embodiment of the present invention. Firstly, in Step S110, a plurality of heat pipes with the same appearance and size is provided. In this embodiment, a length of each heat pipe is L, and the appearance of each heat pipe is a bar-shaped cylinder. Then, the heat pipes are deformed, and both a position of the deformed part and a size thereof are consistent for each heat pipe. If the deformed part is formed by bending, a curvature of the bent part is the same; and if the deformed part is formed by extrusion, a thickness of each extruded heat pipe is the same, that is, both the appearance and the size of the deformed heat pipes are the same. In this embodiment, an end portion 502 of each heat pipe 500 is extruded, so that the end portion 502 has two opposite planes. Preferably, in this embodiment, the whole heat pipe 500 is directly extruded, and thus the whole heat pipe 500 has two opposite planes. Next, in Step S120, the deformed heat pipes are placed in a temperature regulator. In this embodiment, the temperature regulator comprises a case, a heating rod, and a refrigerating device, in which the heating rod and the refrigerating device are disposed in the case. The heater and the refrigerating device are used for adjusting the temperature inside the case. The deformed heat pipes are placed in the case.

Figure 2:
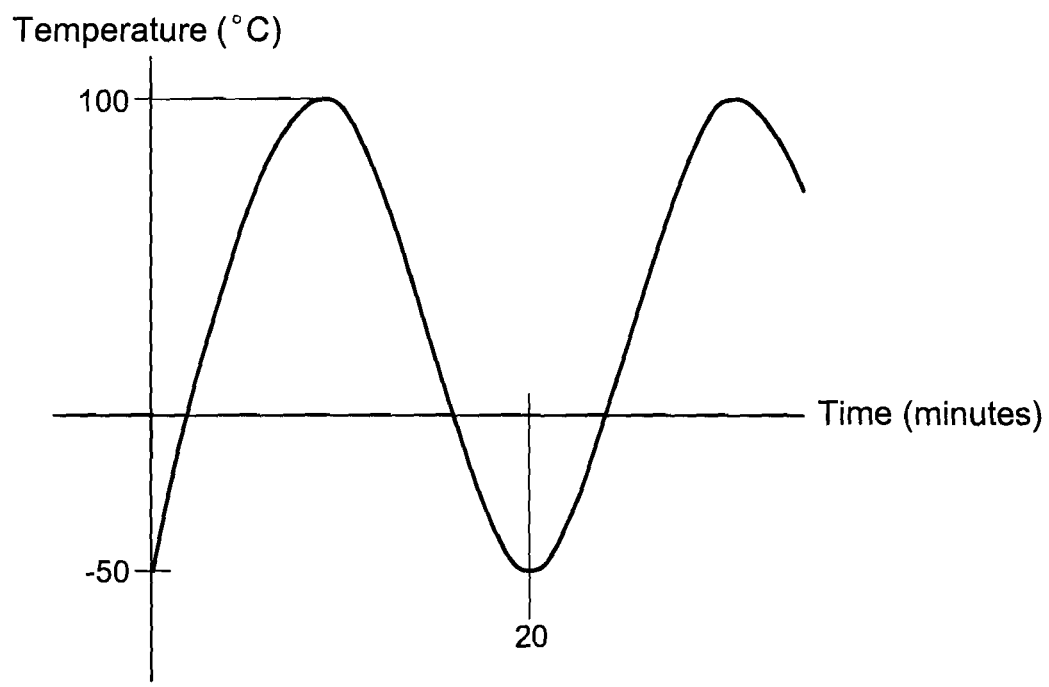
FIG. 2 is a curve of temperature change in a case according to the present invention.

FIG. 2 is a curve of temperature change in the case according to the present invention. Referring to FIG. 2, after the bent heat pipes are placed in the case, the temperature inside the case is periodically changed between a first temperature and a second temperature by the heating rod and the refrigerating device. For example, in this embodiment, the temperature inside the case is raised or lowered at an amplitude of 15° C. per minute, such that the curve of temperature change in the case is a sinusoidal waveform with a period of 20 minutes, in which the first temperature is +100° C. and the second temperature is −50° C. It should be noted that in this embodiment, a single period of the curve of temperature change is defined as a temperature cycle.

In Step S130, after the deformed heat pipes go through several temperature cycles in the case, in this embodiment, the deformed heat pipes are then taken out of the case.

Figure 3:
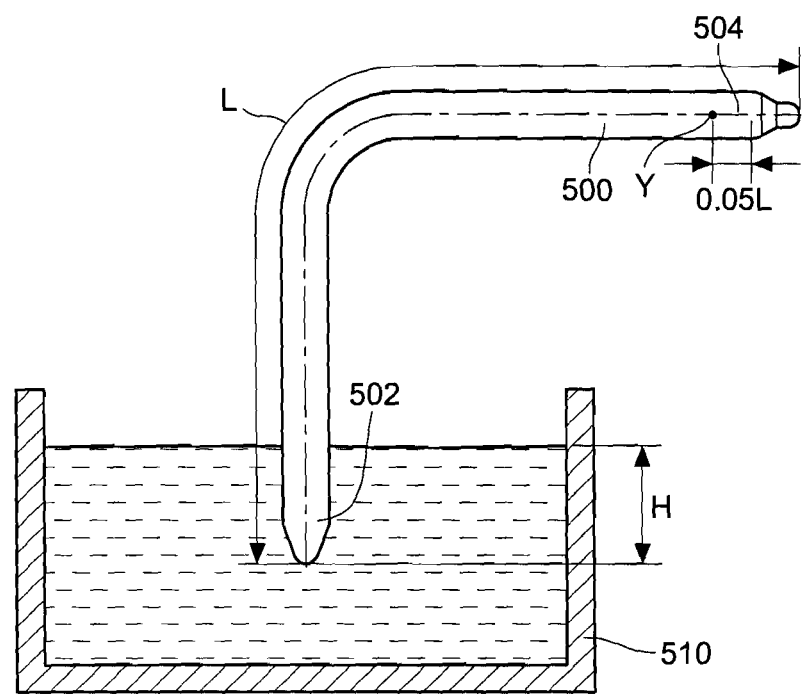
FIG. 3 is a schematic view of a thermostatic device in Step S140 according to the present invention.

Next, in Step S140, one end of each deformed heat pipe is maintained at a third temperature by a thermostatic device, and a heat pipe temperature difference of two opposite ends of the heat pipe is measured, in which the heat pipe temperature difference is greater than zero. FIG. 3 is a schematic view of the thermostatic device in Step S140 according to the present invention. In this embodiment, the thermostatic device is a thermostatic water tank 510, and water in the thermostatic water tank 510 is maintained at a thermostatic state, such that the third temperature is a temperature of the thermostatic water tank 510. For example, the water in the thermostatic water tank 510 is maintained at 60° C. Afterwards, one end portion 502 of each deformed heat pipe 500 is immersed in water to a depth of H. The other end portion 504 of the heat pipe 500 is exposed in an outer environment, in which a temperature of the outer environment is, for example, maintained between 22° C. and 26° C. In a fixed time period starting from the moment that the end portion 502 of the heat pipe 500 is immersed in water, for example, 25 seconds, a temperature difference of the two opposite end portions, that is, the end portion 502 and the end portion 504, of the heat pipe 500 is measured, so as to serve as the heat pipe temperature difference. More particularly, in this embodiment, the measured temperature of the end portion 504 is a temperature of a temperature measuring position Y. When a total length of the heat pipe 500 is L (cm), a distance between the temperature measuring position Y and an effective end of the end portion 504 is 0.05 L (cm).

After that, in Step S150, among the heat pipes 500, the heat pipes 500 having the temperature difference between the temperature of the end portion 502 and the temperature of the temperature measuring position Y smaller than or equal to a first standard temperature difference are tested. In this embodiment, the first standard temperature difference is, for example, 3° C., which is a test value acquired in 25 seconds.

Then, in Step S160, a temperature measuring position X is selected between the end portion 502 and the end portion 504 of each heat pipe 500, the end portion 502 of the heat pipe 500 is heated, and the end portion 504 of the heat pipe 500 is cooled by a cooling device, such that a temperature of the temperature measuring position X is maintained at a fourth temperature, so as to measure a maximum heat transfer rate of each tested heat pipe 500. It should be noted that the temperature measuring position is selected from any positions of a heat insulating region of the heat pipe 500.

Figure 4:
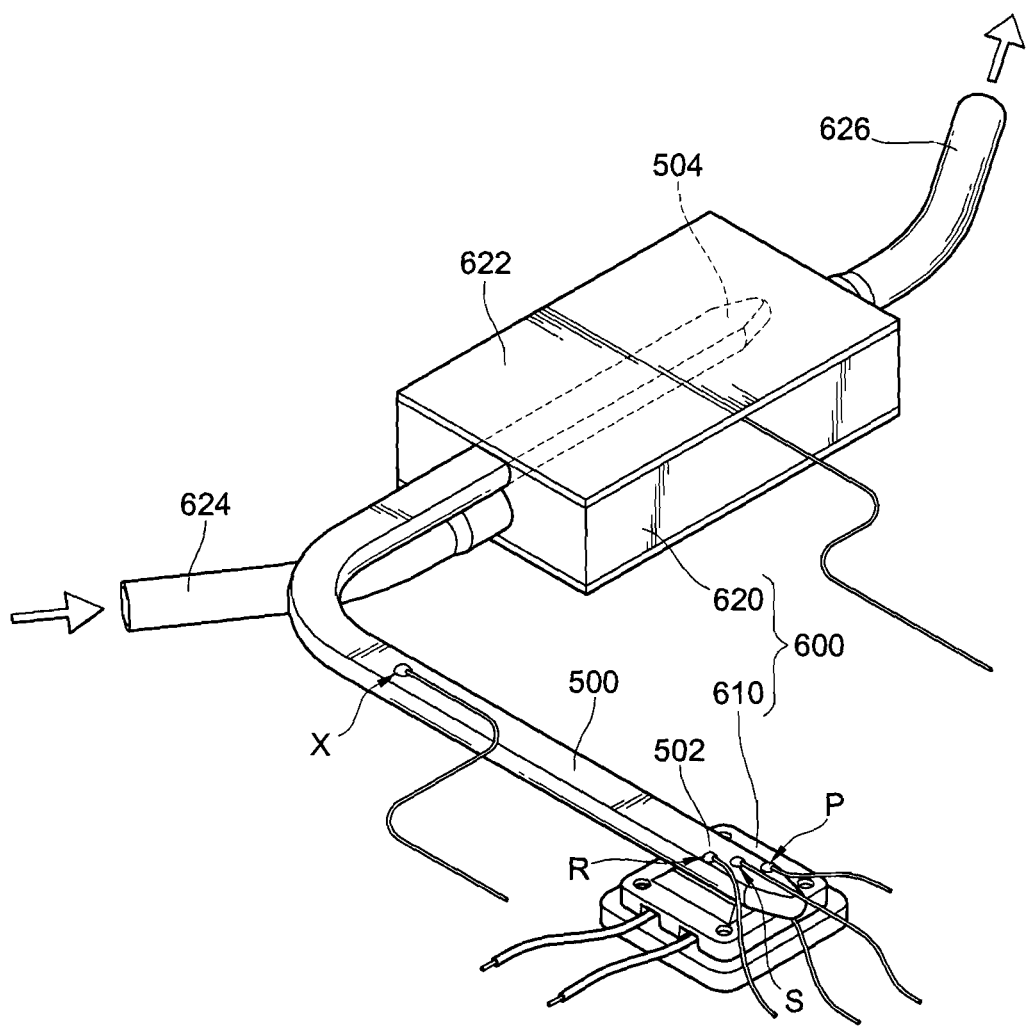
FIG. 4 is a schematic view of a heat pipe and a testing device used for testing a maximum heat transfer rate of the heat pipe according to an embodiment of the present invention.
Figure 5:
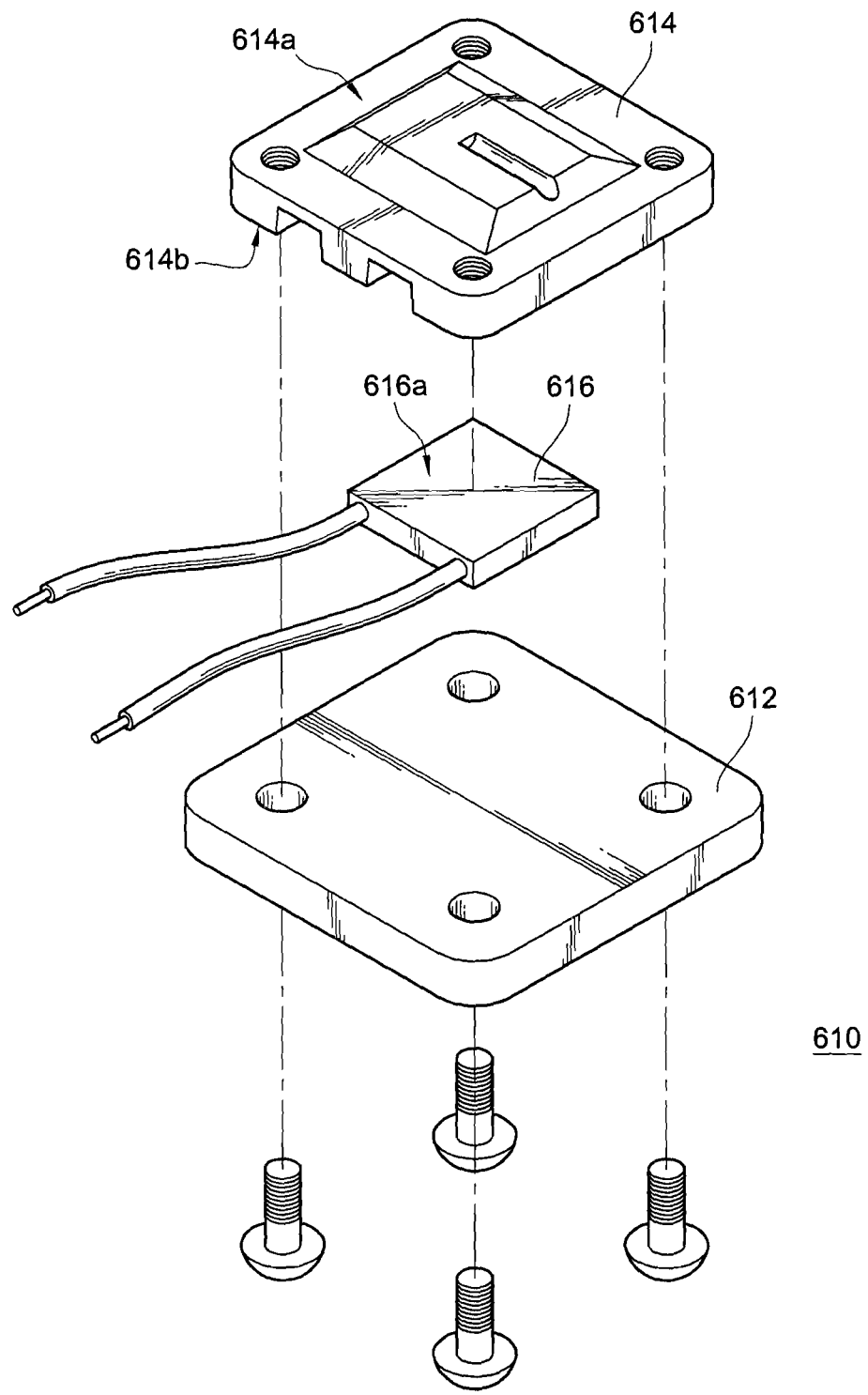
FIG. 5 is a schematic exploded view of a heater in FIG. 4.

FIG. 4 is a schematic view of the heat pipe and a testing device used for testing the maximum heat transfer rate of the heat pipe according to an embodiment of the present invention. Referring to FIG. 4, after the opposite planes are formed on the end portion 502 of the heat pipe, the heat pipe 500 is assembled on a testing device 600 for testing the maximum heat transfer rate of the heat pipe 500. The testing device 600 comprises a heater 610 and a cooling device 620. FIG. 5 is a schematic exploded view of the heater 610 in FIG. 4. Referring to FIGS. 4 and 5, the heater 610 comprises a heat insulating block 612, a heat conducting block 614, and a heating block 616. The heat conducting block 614 has a bearing plane 614a and a pressing plane 614b opposite to each other. The heating block 616 has a heating plane 616a. The heating block 616 is sandwiched between the heat insulating block 612 and the heat conducting block 614, and the heating plane 616a of the heating block 616 is adhered to the pressing plane 614b of the heat conducting block 614. The bearing plane 614a of the heat conducting block 614 is pressed on one of the planes of the heat pipe 500. In this manner, the heating block 616 generates heat, and the heat is transferred to the heat pipe 500 through the heat conducting block 614, so as to heat the end portion 502 of the heat pipe 500.

Referring to FIGS. 4 and 5, the cooling device 620 of this embodiment may be, for example, a water cooling device, which comprises a box 622, a water inlet pipe 624, and a water outlet pipe 626. The box 622 has a chamber, and the water inlet pipe 624 and the water outlet pipe 626 are connected to the box 622 and communicate with the chamber of the box 622. The end portion 504 of the heat pipe 500 passes through a wall surface of the box 622 and is inserted in the chamber. In this embodiment, cooling water is injected into the chamber of the box 622 through the water inlet pipe 624, such that the cooling water absorbs the heat of the end portion 504 of the heat pipe 500. Then, the cooling water is drained out of the box 622 through the water outlet pipe 626, so as to dissipate the heat of the end portion 504 of the heat pipe 500.

Referring to FIGS. 1 and 4, based on the testing device 600, in Step S160 of this embodiment, a temperature measuring position X is selected between the end portion 502 and the end portion 504 of each heat pipe 500, in which the temperature measuring position X is located in the heat insulating region of the heat pipe 500. Preferably, the temperature measuring position X is located on a central position of the heat insulating region. Then, the heat Q (watts) generated by the heating block 616 is continuously raised, and a flowing speed or a temperature of the cooling water of the water inlet pipe 624 is adjusted, so as to maintain the temperature of the temperature measuring position X of the heat pipe 500 at a fourth temperature. Next, the temperature change of the end portion 502 and the end portion 504 of the heat pipe 500 is measured. A heat resistance R (° C./W) of the heat pipe 500 changed with the heat Q is then calculated, in which $$R = \frac{\text{Temperature of the end portion 502} - \text{Temperature of the end portion 504}}{\text{Heat } Q}$$

Preferably, the temperature of the end portion 504 is an average value. For example, in FIG. 6, three temperature measuring positions, namely, a temperature measuring position P, a temperature measuring position S, and a temperature measuring position R, are selected on the end portion 504. Afterwards, an average value of temperatures measured at the temperature measuring position P, the temperature measuring position S, and the temperature measuring position R serves as the temperature of the end portion 504. Similarly, in this embodiment, a plurality of temperature measuring positions may also be selected on the end portion 502, and an average value of temperatures of the temperature measuring positions serves as the temperature of the end portion 502.

Figure 6:
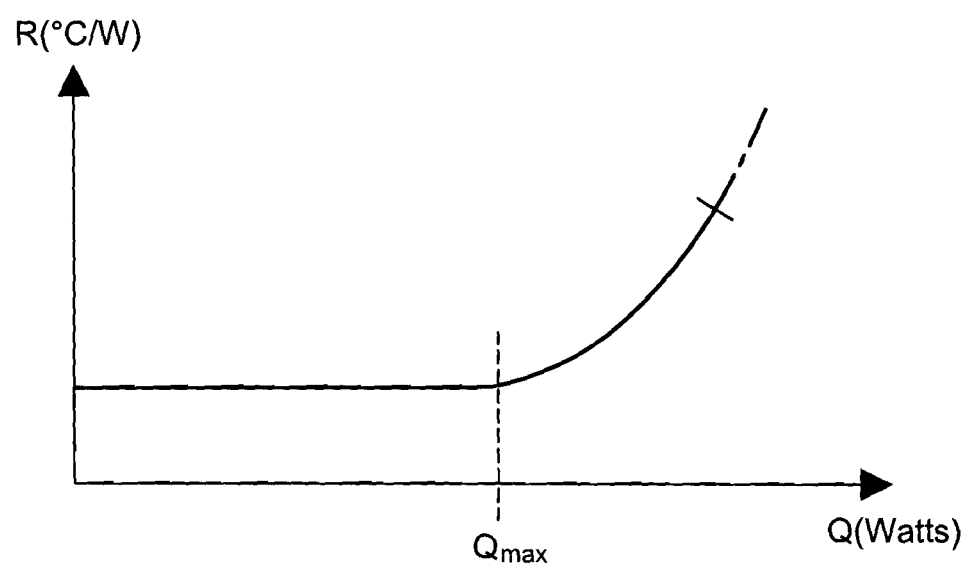
FIG. 6 is a schematic view illustrating changes of a heat resistance R of the heat pipe along with a heat Q according to the present invention.

FIG. 6 is a schematic view illustrating changes of the heat resistance R of the heat pipe 500 along with the heat Q. Referring to FIG. 6, when the heat generated by the heating block 616 is smaller than $Q_{max}$, the heat resistance R of the heat pipe is maintained at a fixed value, and when the heat generated by the heating block 616 is greater than or equal to $Q_{max}$, the heat resistance R of the heat pipe is largely increased. Therefore, in this embodiment, when the heat Q generated by the heating block 616 is gradually raised to $Q_{max}$, and the heat resistance value R of the heat pipe is largely increased from a fixed value, the $Q_{max}$ is a maximum heat transfer rate of the heat pipe 500.

Next, in Step S170, the heat pipes 500 having the maximum heat transfer rate $Q_{max}$ lower than a standard rate in the tested heat pipes 500 are marked.

Further referring to FIG. 1, in addition to the above steps, in this embodiment, a damage temperature of each heat pipe 500 is also measured, in which the damage temperature refers to the temperature of the heat pipe 500 when the heat pipe 500 breaks. The step of measuring the damage temperature of the heat pipe 500 is described in detail below.

In Step S180, the end portion 502 of the heat pipe 500 is heated by a heating jig until the heated heat pipe 500 breaks or leaks, a temperature when each heat pipe breaks or leaks is recorded, and the temperature serves as the damage temperature of the heat pipe 500. Afterwards, in Step S190, the heat pipes having the damage temperature lower than a second standard temperature in the heat pipes 500 are marked.

Based on the above method, the number of the marked heat pipes is counted, so as to evaluate the quality of the heat pipes provided by a heat pipe supplier.

Generally, the heat pipes of the heat dissipation modules installed in a notebook computer are deformed to have a bent appearance. In the above embodiments, the bar-shaped heat pipes are firstly bent and then tested, so that the testing method simulates the state that the heat pipes are installed in a notebook computer. Therefore, actual performances of the heat pipes when assembled in the heat dissipation modules can be accurately predicted through a test result acquired in the testing method.

Moreover, in addition to being bent, the heat pipe of the heat dissipation module installed in the notebook computer is pressed on a chip by a heat conducting block, and a plane on a surface of the heat pipe is adhered to a bearing surface of the heat conducting block. In the above embodiments, a plane is formed on the other end of each heat pipe, and then pressed on a bearing plane of a heater, so that the testing method simulates the state that the heat pipes are installed in a notebook computer. Therefore, actual performances of the heat pipes when assembled in the heat dissipation modules can be accurately predicted through a test result acquired in the testing method.

What is claimed is:

1. A method for testing heat pipes, comprising:
   providing a plurality of bar-shaped heat pipes having the same size, and deforming the heat pipes;
   placing the deformed heat pipes in a temperature regulator, such that a temperature of the heat pipes is periodically changed between a first temperature and a second temperature;
   taking the heat pipes out of the temperature regulator;
   maintaining one end of each heat pipe at a third temperature by a thermostatic device, and measuring a heat pipe temperature difference of two opposite ends of the heat pipe, wherein the heat pipe temperature difference is greater than zero; and
   marking the heat pipes having the heat pipe temperature difference smaller than or equal to a first standard temperature difference in the heat pipes.

2. The method for testing the heat pipes according to claim 1, wherein the step of maintaining one end of each heat pipe at the third temperature by the thermostatic device comprises:
   immersing one end of each heat pipe in a thermostatic water tank, and maintaining water in the thermostatic water tank at a thermostatic state; and
   measuring the heat pipe temperature difference of the two opposite ends of the heat pipe after a measuring time.

3. The method for testing the heat pipes according to claim 1, wherein after the step of marking the heat pipes having the heat pipe temperature difference smaller than or equal to the first standard temperature difference in the heat pipes, the method further comprises:
   selecting a temperature measuring position between the two ends of each heat pipe;
   heating one end of the heat pipe, and cooling the other end of the heat pipe by a cooling device, so as to maintain a temperature of the temperature measuring position of the heat pipe at a fourth temperature, thereby acquiring a maximum heat transfer rate of each heat pipe; and
   marking the heat pipes having the maximum heat transfer rate lower than a standard rate in the heat pipes.

4. The method for testing the heat pipes according to claim 3, wherein the step of maintaining the temperature of the temperature measuring position of the heat pipe at the fourth temperature further comprises:
   forming a plane on the other end of the heat pipe;
   pressing the plane on a bearing plane of a heater; and
   heating the heat pipe by the heater.

5. The method for testing the heat pipes according to claim 3, wherein after the step of marking the heat pipes having the maximum heat transfer rate lower than the standard rate in the heat pipes, the method further comprises:

heating one end of each heat pipe by a heating block until the heat pipe breaks or leaks, and recording a damage temperature when each heat pipe breaks or leaks; and marking the heat pipes having the damage temperature lower than a second standard temperature in the heat pipes.

6. A method for testing heat pipes, comprising:

providing a plurality of bar-shaped heat pipes having the same size, and deforming the heat pipes;

placing the deformed heat pipes in a temperature regulator, such that a temperature of the heat pipes is periodically changed between a first temperature and a second temperature;

taking the heat pipes out of the temperature regulator;

immersing one end of each heat pipe in a thermostatic water tank, and maintaining water in the thermostatic water tank at a thermostatic state;

measuring the heat pipe temperature difference of the two opposite ends of the heat pipe after a measuring time measuring a heat pipe temperature difference of two opposite ends of the heat pipe, wherein the heat pipe temperature difference is greater than zero;

marking the heat pipes having the heat pipe temperature difference smaller than or equal to a first standard temperature difference in the heat pipes selecting a temperature measuring position between the two ends of each heat pipe;

forming a plane on the other end of the heat pipe, pressing the plane on a bearing plane of a heater, heating one end of the heat pipe by the heater, and cooling the other end of the heat pipe by a cooling device, so as to maintain a temperature of the temperature measuring position of the heat pipe at a fourth temperature, thereby acquiring a maximum heat transfer rate of each heat pipe;

marking the heat pipes having the maximum heat transfer rate lower than a standard rate in the heat pipes heating one end of each heat pipe by a heating block until the heat pipe breaks or leaks, and recording a damage temperature when each heat pipe breaks or leaks; and marking the heat pipes having the damage temperature lower than a second standard temperature in the heat pipes.

* * * * *